Patented Feb. 10, 1953

2,628,237

UNITED STATES PATENT OFFICE 2,628,237

ALKALI METAL SALTS OF ISONICOTINYL-HYDRAZINOMETHANESULFINIC ACID

Herman Herbert Fox, Passaic, N. J., assignor to Hoffmann-La Roche Inc., Nutley, N. J., a corporation of New Jersey No Drawing. Application May 24, 1951, Serial No. 228,114

2 Claims. (Cl. 260—295)

This invention relates to alkali metal salts of isonicotinylhydrazinomethanesulfinic acid, obtainable by the reaction of isonicotinylhydrazine with an alkali metal formaldehyde sulfoxylate, as exemplified by sodium isonicotinylhydrazinomethanesulfinate, which can also be designated as isonicotinylhydrazine sodium formaldehyde sulfoxylate and which can be formulated as p-$C_5H_4NCONHNHCH_2SO_2Na \cdot xH_2O$; the "$xH_2O$" indicating varying amounts of water of crystallization found in different preparations of the material. These salts are novel compounds useful in the field of therapeutics, and more particularly, useful to combat tuberculosis.

The compounds of the invention can be prepared by reacting isonicotinylhydrazine (alternatively known as isonicotinic acid hydrazide) with an alkali metal formaldehyde sulfoxylate, preferably in molar proportions and preferably in an organic solvent. A convenient method of preparation comprises dissolving the reactants in the minimum amount of an organic solvent therefor and diluting the solution with a large excess of an organic liquid which is miscible with said solvent but which is a non-solvent for the product.

The invention is further disclosed in the following example, which is illustrative but not limitative thereof.

Example 137 grams (=1 mol) of isonicotinylhydrazine and 154 grams (=1 mol) of sodium formaldehyde sulfoxylate were dissolved in 700 cc. of warm methanol. The solution was filtered and the clear filtrate was added slowly, with stirring, to 3 liters of acetone. To the resulting mixture were then added 4 additional liters of acetone, and the whole was allowed to stand overnight. The resulting precipitate was filtered off, washed with acetone, and dried under vacuum. The product, sodium isonicotinylhydrazinomethanesulfinate, was obtained as a cream-colored crystalline powder. It was soluble in water and in methanol.

I claim:

1. An alkali metal salt of isonicotinylhydrazinomethanesulfinic acid which can be represented by the formula p-$C_5H_4NCONHNHCH_2SO_2M \cdot xH_2O$, wherein M represents an alkali metal and $xH_2O$ represents a variable amount of water of crystallization.

2. Sodium isonicotinylhydrazinomethanesulfinate which can be represented by the formula p-$C_5H_4NCONHNHCH_2SO_2Na \cdot xH_2O$ wherein $xH_2O$ represents a variable amount of water of crystallization.

HERMAN HERBERT FOX.

No references cited.